(12) United States Patent
Oliva et al.

(10) Patent No.: US 6,654,802 B1
(45) Date of Patent: Nov. 25, 2003

(54) NETWORK SYSTEM AND METHOD FOR AUTOMATIC DISCOVERY OF TOPOLOGY USING OVERHEAD BANDWIDTH

(75) Inventors: Stephen Arthur Oliva, Foothill Ranch, CA (US); Brian Crowe, Garland, TX (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 09/249,676

(22) Filed: Feb. 12, 1999

(51) Int. Cl.[7] .............................................. G06F 15/173
(52) U.S. Cl. ....................... 709/224; 709/223; 709/248; 370/221; 370/254; 370/255; 370/392
(58) Field of Search ................................. 709/220, 224, 709/226, 201, 223, 238, 242, 245, 230, 237, 249; 370/254, 255, 352, 400, 392, 397, 221

(56) References Cited

U.S. PATENT DOCUMENTS

| | | | |
|---|---|---|---|
| 5,481,674 A | | 1/1996 | Mahavadi |
| 5,606,669 A | | 2/1997 | Bertin et al. |
| 5,684,959 A | | 11/1997 | Bhat et al. |
| 5,729,685 A | * | 3/1998 | Chatwani et al. ........... 709/224 |
| 5,732,086 A | | 3/1998 | Liang et al. |
| 5,737,319 A | | 4/1998 | Croslin et al. |
| 5,740,346 A | * | 4/1998 | Wicki et al. ............ 395/182.02 |
| 5,793,975 A | | 8/1998 | Zeldin |
| 5,796,736 A | | 8/1998 | Suzuki |
| 5,815,490 A | | 9/1998 | Lu |
| 5,841,759 A | * | 11/1998 | Russ et al. ................... 270/221 |
| 6,003,074 A | * | 12/1999 | Vasconcellos ............... 709/220 |
| 6,094,682 A | * | 7/2000 | Nagasawa .................... 709/224 |
| 6,202,094 B1 | * | 3/2001 | Grosser, Jr. et al. ........ 709/226 |
| 2002/0004847 A1 | * | 1/2002 | Tanno ......................... 709/249 |

* cited by examiner

Primary Examiner—Hosain T. Alam
Assistant Examiner—Oanh Duong

(57) ABSTRACT

A system and method for continuously monitoring neighboring network elements and determining physical connection topology and changes in topology among network elements. Each port in a network element capable of having physical connectivity to a port on an adjacent network element has a unique identification of the node and a unique identification of the port. The identification is both available to the network management system and continuously transmitted on the physical link between two ports in the network, thus identifying the transmitting port to the receiving port. As nodes and ports are added to or deleted from a network, a representation of the nodes or ports is added or removed from the network management system. The local operating program in each network element informs the network management system of changes, or changes are queried by a network management system. The transmission of identification takes place in overhead data channels, designated as topology trace channels, which are designed into the overall framework of the transmission system and its equipment. No information capacity that could support network customer traffic or network control traffic between network elements is pre-empted.

17 Claims, 7 Drawing Sheets

TWO UNCONNECTED NE w/3 PORTS EACH

STS-1 SPE WITH PATH OVERHEAD AND PAYLOAD CAPACITY SHOWN

FIG. 6

STS-N FRAME

| | Transport Overhead | | | Path Overhead |
|---|---|---|---|---|
| | Framing<br>A1 | Framing<br>A2 | Trace/Growth<br>(STS-ID)<br>J0/Z0[a] | Trace<br>J1 |
| Section Overhead | BIP-8<br>B1/Undefined[a] | Orderwire<br>E1/Undefined[a] | User<br>F1/Undefined[a] | BIP-8<br>B3 |
| | Data Com<br>D1/Undefined[a] | Data Com<br>D2/Undefined[a] | Data Com<br>D3/Undefined[a] | Signal Label<br>C2 |
| | Pointer<br>H1 | Pointer<br>H2 | Pointer Action<br>H3 | Path Status<br>G1 |
| | BIP-8<br>B2 | APS<br>K1/Undefined[a] | APS<br>K2/Undefined[a] | User Channel<br>F2 |
| Line Overhead | Data Com<br>D4/Undefined[a] | Data Com<br>D5/Undefined[a] | Data Com<br>D6/Undefined[a] | Indicator<br>H4 |
| | Data Com<br>D7/Undefined[a] | Data Com<br>D8/Undefined[a] | Data Com<br>D9/Undefined[a] | Growth<br>Z3 |
| | Data Com<br>D10/Undefined[a] | Data Com<br>D11/Undefined[a] | Data Com<br>D12/Undefined[a] | Growth<br>Z4 |
| | Sync Status/<br>Growth<br>S1/Z1[a] | REI-L[b]/Growth<br>M0 or M1/Z2[a] | Orderwire<br>E2/Undefined[a] | Tandem<br>Connection<br>Z5 | a. For entries of the form "X/Y", the first label shown is applicable for one STS-1 in an STS-N electrical or OC-N signal, and the second label is applicable for the remaining STS-1s.
b. REI-L (Line Remote Error Indication) was previously referred to as Line FEBE.

TRANSPORT AND PATH OVERHEAD BYTE DESIGNATIONS

FIG. 10

TWO CONNECTED NE, CONNECTION AUTO-DISCOVERED BY MANAGEMENT SYSTEM

*FIG. 11*

NETWORK SYSTEM AND METHOD FOR AUTOMATIC DISCOVERY OF TOPOLOGY USING OVERHEAD BANDWIDTH

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

This invention generally relates to automatic discovery of network topology in multi-node, multi-connection telecommunications networks. In particular, the invention relates to real-time dynamic determination of the physical topology of a network as nodes and/or ports interfacing physical inter-node connections are added to, or deleted from, the network.

2. Description of the Prior Art

Large telecommunications networks are comprised of multiple network elements, each possibly having multiple ports for passing data between the various network elements. A subset of network elements used to transport information may be described as the transmission system. The transmission elements of a telecommunications network transmission system are those elements that interface various transmission links, such as optical fibers, conducting wires or cables, or wireless radio links of various types. The data transported by the transmission system may include: voice, video, digital and analog data in many different formats.

Transmission systems typically include various layers of software. For example, the Open System Interconnection reference model includes seven layers, such as the physical layer. Regardless of the model, the physical layer comprises the various network elements and the associated interconnections. The software drivers for implementing the physical layer direct how bits are placed on and removed from the physical connections between network elements.

System-specific information is transferred between network elements primarily using overhead in the links between ports to communicate among nodes. Overhead may take one or both of two forms. One form is a structure where system control data is defined and formatted to always be present, coexisting with the transmission space allocated to carrying network customer information (i.e. payload), and always allowing a specific amount of customer information to be supported in a given physical path. The various designators in the overhead may change, but the change does not alter the amount of bandwidth or frame capacity dedicated to payload. Examples of standards applied for implementing the physical layer of a communications network are the Synchronous Optical NETwork standard (SONET) and Synchronous Digital Hierarchy (SDH) transmission systems. Another example associated with a data link layer of software is Asynchronous Transfer Mode (ATM) systems.

Another form of overhead is a structure where specifically formatted information is transmitted along with the payload of the network. Examples of this are Resource Management (RM) cells in an ATM system, and Neighbor Information Frames (NIF) in an Fiber Distributed Data Interface (FDDI) network.

One byte of the former type of overhead data, such as defined by SONET, is the Section Trace byte (J0). The Synchronous Digital Hierarchy standard defines the Section Trace byte as a 16 byte message string. As originally intended, the Section Trace byte is repetitively transmitted so that a receiving network element may verify continued connection to the intended transmitting network element. In the case where Network administrators elected not to use the Section Trace byte capability, a 01 Hex is transmitted in the byte.

Regardless of the standards used, transmission systems in large telecommunications networks may change their connectivity characteristics at irregular intervals, such as when new network elements or ports are added to or deleted from the network. Connectivity may also change due to equipment or link failures or maintenance. The current connectivity state of a network is called its topology.

Precise topology information is needed to accomplish many telecommunications network functions. The ability to place a new connection for transferring information from one port to another port, or multiple ports, through a process referred to as circuit provisioning or connection management, is dependent on accurate network topology information. Other dependencies include correlation of network alarms to specific physical locations and restoration of failed connections.

The overall network topology is typically manually entered into a record for use by a management system. If a network element or port is added or removed, the record of the network topology is manually altered to reflect the change. This manual process is subject to human error and requires significant time and resources. Errors result in significant resource expenditures for trouble shooting.

Automatic discovery of the network topology without manual entry of the topology may be provided. These methods rely on transferring topology data between network nodes using data space, such as cells or frames, that might otherwise be used for transmitting customer payload data. One such method is disclosed by Chatwani et al. in U.S. Pat. No. 5,729,685. Data Link layer software, such as Asynchronous Transfer Mode (ATM) protocol software, is used to transmit topology information to the network management system. Link advertisement messages on each of the ports of each ATM switch in the network are transmitted as part of the payload. The messages are received by neighbor switches and forwarded to a topology manager that constructs an overall network topology profile. However, use of the payload bandwidth reduces the amount of bandwidth for transmitting user information. Furthermore, the Data Link layer is removed from the network elements and other hardware.

U.S. Pat. No. 5,481,674 by Mahavadi, describes a method for generating a topology map between devices on an FDDI network. In an FDDI network, a token is passed from controller to controller in a predetermined direction on a path or ring containing all controllers connected to the network. The system determines upstream and downstream neighbors and ports on the FDDI network by performing a mapping based on received Station Information Frame (SIF) responses consecutively sent to elements of the network through exiting connections and ports. The SIF occupies the same information path as the user data.

The above described art reduces the usable traffic capacity (i.e. payload) in a given network link to communicate topology information. The present invention is directed to improvements that allow automatic discovery of network topology without a corresponding reduction in payload bandwidth at the physical layer.

SUMMARY OF THE INVENTION

This invention relates to a system and method for determining the topology of a multi-node network such that the method used does not reduce the originally designed information-carrying capacity of the network links, or interrupt existing payload traffic. Overhead data, such as associated with the physical layer, is specifically identified for and is used to transmit unique network and port identifiers from a source node to a destination node connected by a link. The transmission may be continuous.

Each port in a network element has local knowledge of the identity of the corresponding port and network element at the far end of the physical link. A network management system correlates the data in each network element in order to form a topology map for the entire network, allowing the network management system to track changes in links and ports.

Local knowledge in the network element is maintained through the use of object-oriented programming techniques, where the identification of a far-end port is maintained as an attribute associated with the object representing the local port. Changes in this far-end identification attribute causes the object to be updated, resulting in a topology change.

In one aspect described below, a method and system for determining network topology in a communications network is provided. A first network element is connected to a second network element. Data from the first network element is continuously transmitted to the second network element, each transmission of data comprising physical layer overhead data and payload data. A network element identification is provided in the physical layer overhead data without reduction of a bandwidth of the payload data. The network topology is determined from at least the network element identification transmitted to the second network element.

In another aspect described below, a method and system for determining network topology in a communications network comprises: (a) providing first and second network elements, the first network element comprising at least a first port and the second network element comprising at least a second port and a register; (b) connecting the first port to the second port; (c) transmitting a first network element and first port identifier from the first network element to the second network element; (d) storing the first network element and first port identifier in the register; and (e) determining a connection relationship between at least the first and second network elements as a function of the first network element and first port identifier stored in the register.

DETAILED DESCRIPTION OF PREFERRED EMBODIMENTS

Figure 1:
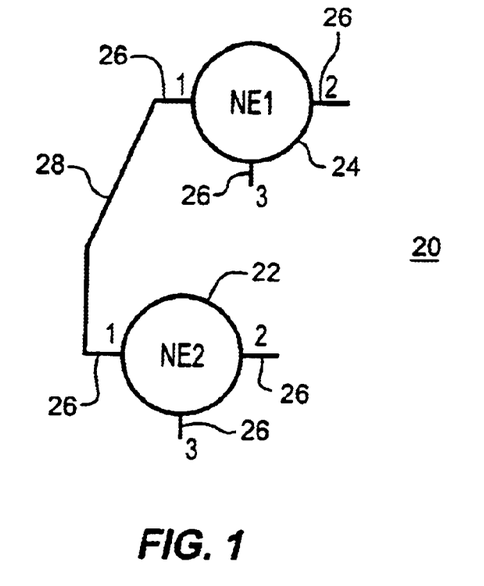
FIG. 1 is a graphical representation of one embodiment of two network elements in a telecommunications network.
Figure 2:
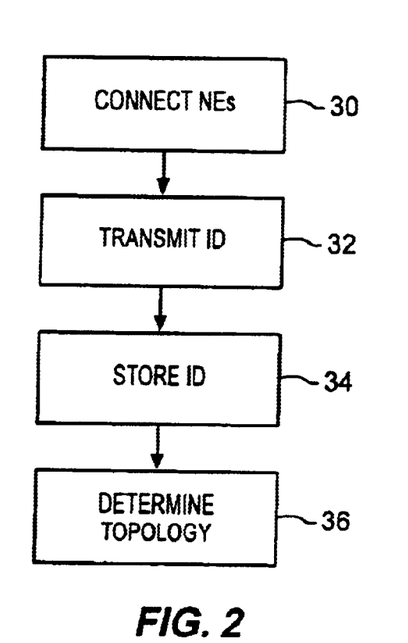
FIG. 2 is a flow chart of one embodiment for determining network topology.

Referring to FIGS. 1 and 2, a network and a flow chart for determining network topology is shown. The topology of the multi-node network is determined without reducing the payload information-carrying capacity or bandwidth of the network links or without interrupting existing payload traffic. Overhead data, such as associated with the physical layer, is used to transmit unique network and port identifiers from a source node to a destination node connected by a link. The topology is determined from the identifiers.

Referring to FIG. 1, a graphical representation of one embodiment of a telecommunications network is shown generally at 20. Network 20 comprises network elements 22 and 24, ports 26 and link 28. Additional network elements 22 and 24 may be provided. Additional links between network elements 22 and 24 or between one of network elements 22 and 24 and another element may also be provided.

Each network element 22 and 24 comprises a node. Each network element 22 and 24 comprises a switch and includes processing and memory resources which enable operation and communication of configuration and status information to a network management system. The memory resources comprise any data storage device, such as RAM, a hard drive or other devices. The memory resources may be divided to include registers for storing information. For example, two registers are provided for every port 26 in each network element 22 and 24. In the destination network element, one register stores information identifying the destination port 26 and network element 22 or 24. The second register is for storing information identifying the source port 26 and network element 24 or 22 connected to the destination port 26.

A unique network element identifier is stored in each network element 22 and 24. The network element identifier distinguishes one network element 22 or 24 from all other network elements 24 or 22. The network element identifier is stored in the memory resources. In one preferred embodiment, the network element identifier is stored in a network element identifier register of the memory.

Each node has multiple ports 26. Each port 26 comprises the physical interface to the transmission media and sufficient hardware and programming resources to effect performance monitoring, fault reporting, connection management and other characteristic functions needed for a techonogoly. As shown, each network element 22 and 24 includes three ports 26, but more or fewer ports may be provided on any one or more of network elements 22 and 24. The number of ports 26 or network elements 22 and 24 may change.

A unique port identifier is stored in each network element 22 and 24 for each port 26. The port identifier distinguishes one port 26 from all other ports 26 on any particular network elements 24 or 22. The port identifier is stored in the memory resources. In one preferred embodiment, each port identifier is stored in a port identifier register of the memory where a separate register is provided for each port identifier.

Each node is connected to one or more other nodes through ports 26 and the physical interconnecting links 28 between them. Links 28 comprise any physical connection, such as fiber optics, metal conductors or other connection for transmitting analog or digital data. Links 28 are uni- or bi-directional.

Referring to FIG. 2, a flow chart representing one preferred embodiment for determining the topology of network 20 is shown. An original or new link 28 is established in step 30 to connect two network elements 22 and 24.

After connecting network elements 22 and 24 with link 28, overhead data is transmitted from a source node to a destination node. Either of the network elements 22 or 24 comprises the source node and the other network element 24 or 22 comprises the destination node. The data is formatted by physical layer software pursuant to the design requirements of the transmission system and includes overhead and payload data in frames. The dedicated overhead data may comprise the same or varying bandwidth between any two frames. Within the payload of a frame defined by the physical layer software, frames of information established pursuant to other software may be provided, such as transport layer frames of data. In alternative embodiments, the basic frame structure is defined pursuant to software other than the physical layer software, such as transport layer software.

In step 34, each source port 26 of each node transmits the network element and port identifiers using transport overhead bytes that are part of the overall design of the transmission system. The network element and port identifiers are obtained from the memory resources of network element 22 or 24 and are inserted into the overhead of one or more frames of data.

The transport overhead bytes occupy some of the capacity of the physical link 28, but a specific amount of capacity or bandwidth of link 28 is always available for use by the payload traffic capacity. Many possible designs utilizing various overhead bytes or combinations of bytes are possible. The design incorporates overhead bytes designated for use in determining network topology. Once a particular overhead configuration is decided upon, the payload capacity is fixed at a given amount for a given frame of data. The port and network element identifiers are transmitted as part of the overhead data without reducing the bandwidth available for payload data.

The network element and port identifiers are received by the destination node. In step 34, the destination node locates the overhead data designated for topology determination (i.e. the data reserved for the identifiers) and stores the source identifiers in the memory resources, such as those resources associated with the object representing the part receiving the topology data.

In one embodiment, the identifiers are buffered in the memory resources and forwarded to the management system with or without long term storage. In other embodiments, network element 22 or 24 flags any changes in the identifiers to the management system. The management system then requests transfer of the identifiers. In yet another embodiment, the management system periodically checks for or receives identifiers from the various network elements 22 and 24. Alternatively, one of network elements 22 or 24 comprises the management system, so identifiers stored at that network element 22 or 24 are available without transfer. The data is transferred to the management system over separate management links as overhead or payload data.

In step 36, the topology of network 20 is determined. The management system or a network element 22 or 24 determines a topology map or relationship as a function of the identifiers. Identification of each source port 26 and network element 22 or 24 is obtained from each destination port 26 and network element 22 or 24. For example, port 1 of network element 22 comprises a source port 26. Destination network element 24 stores the identification information received at destination port 1. The direction of transmission and connections between network elements are determined.

Figure 3:
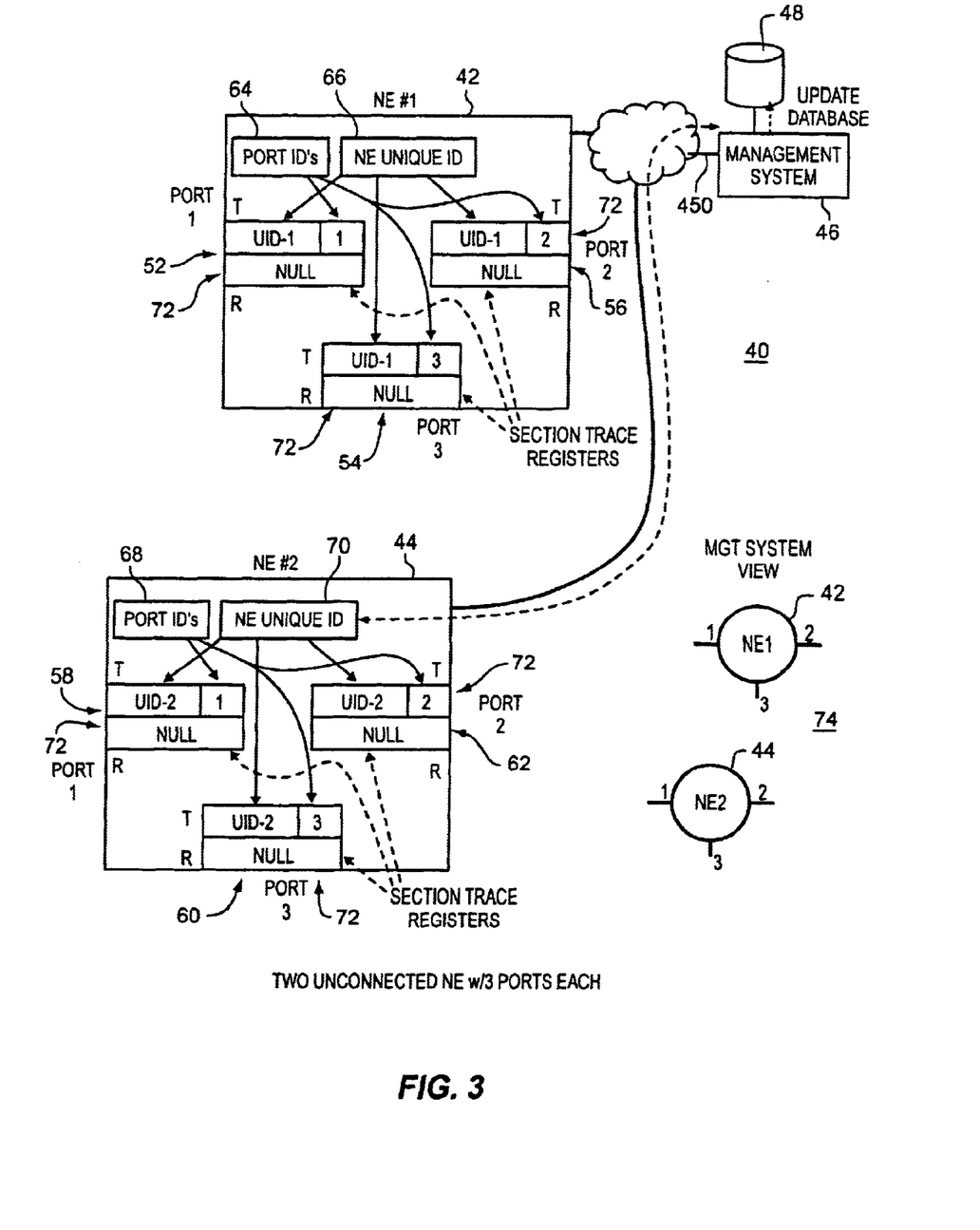
FIG. 3 is a graphical representation of a second embodiment of two network elements in a telecommunications network.

Referring to FIG. 3, a graphical representation of another embodiment of a telecommunications network is shown generally at 40. Network 40 includes network elements 42 and 44, management system 46, memory 48 and management links 50. In alternative embodiments, network 40 comprises additional network elements 42 and 44.

Network elements 42 and 44 comprise transmission devices, including a processor and memory. Network elements 42 and 44 include one or more ports 52, 54, 56, 58, 60 and 62, network element identifiers 66 and 70, port identifiers 64 and 68, and registers 72. Ports 52, 54, 56, 58, 60 and 62 include registers 72 for storing the received identifiers. Registers 72 comprise memory, such as buffers, RAM, hard drives or other memory devices. More or fewer ports and associated port identifiers and registers may be provided on one or more of network elements 42 and 44.

Network element and port identifiers 64, 66, 68 and/or 70 are resident in network element 42 and/or 44 or ports 52, 54, 56, 58, 60 and 62 when the device is manufactured, are entered manually through a local interface device at the time of installation, or are provided by management system 46.

Management system 46 comprises a processor, computer or other device for managing network 40. Management system 46 stores data in memory 48. Memory 48 comprises a RAM, hard drive or other memory device. Using memory 48, management system 46 determines the topology of network 40. The topology is determined from identifiers provided by network elements 42 and 44 over management links 50.

Management links 50 comprise fiber optic, wire or other conductors for transferring management information. In one embodiment, management links 50 transfer only management information. In alternative embodiments, management links 50 transfer payload along with data associated with network users.

Each network element 42 and 44 is installed and connected to management system 46 over management links 50. Management system 46 either obtains or reads network element identifier 66 and 70 from network elements 42 and 44, respectively, or assigns a unique network element identifier 66 and 70 to network elements 42 and 44, respectively. Management system 46 also queries or is provided by network elements 42 and 44 which ports 52, 54, 56, 58, 60 and 62 are present. Each port 52, 54, 56, 58, 60 and 62 in each network element 42 and 44 is assigned a unique identifier, either by respective network elements 42 and 44 (e.g. through a built-in process, or manually entered by Craft Interface Terminal (CIT)) or by management system 46.

Management system 46 also queries or is provided the characteristics of the ports 52, 54, 56, 58, 60 and 62, such as link information. Since network elements 42 and 44 are not yet connected to other network elements 42 and 44 as shown in FIG. 3, a null or other set value representing no connection is provided to management system 46.

In one preferred embodiment, the identification of network element 42 and 44 and a port identification is stored in separate registers 72 for each port 52, 54, 56, 58, 60 and 62. Thus, each port is uniquely identified by network element 42 and 44 and port 52, 54, 56, 58, 60 and 62. These identifiers are provided to a management system 46 as tables or attributes to objects. Management system 46, based on the identifiers and associated connection information (e.g. no current connections), determines topology 74. If additional network elements already comprise part of network 40, the connections and additional network elements are included as part of topology 74 of physical links and nodes.

For each connection between network elements 42 and 44, the source network node, such as network element 42, provides identification of the source network element as well as identification of the source port, such as port 52, using byte(s) in the frame overhead to the destination node, such as network element 44. Each destination node continuously receives the identification of the source port and source node at the far end of each link 28.

Each destination node associates this unique identification with a programming object that represents the destination port in the operating system of the destination node. For example, the identification of the source port and network element is stored in register 72 associated with the destination port of the destination node. Destination ports that are not connected have null values assigned in this programming object, as shown in unconnected network elements 42 and 44 of FIG. 3. Other values may be used.

In one preferred embodiment, management system 46 is notified of all changes in this far-end port attribute (i.e. attribute associated with the programming object stored in register 72), as well as when ports 52, 54, 56, 58, 60 and 62 are installed in, or removed from, network elements 42 and 44, or when network elements 42 and 44 are installed in, or removed from, transmission network 40. Management system correlates these attributes into an overall network topology 74.

In one preferred embodiment, network 40 comprises a network operated pursuant to the SONET standard for operating the physical layer of network 40. Other standards maybe used, such as SDH. Other standards may be modified to include topology information in the overhead or header, such as modifying FDDI or ATM. Current requirements for SONET networks are as outlined in American National Standards Institute (ANSI) standard T1.105, with generic requirements as outlined in Bellcore document GR-253-CORE.

Figure 4:
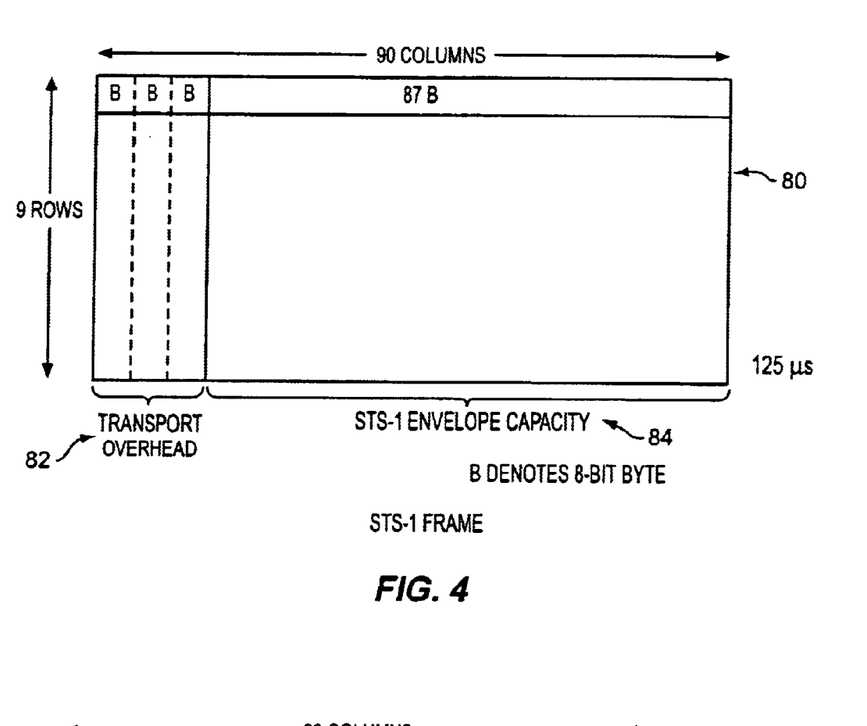
FIG. 4 is a graphical representation of a SONET STS-1 frame.
Figure 5:
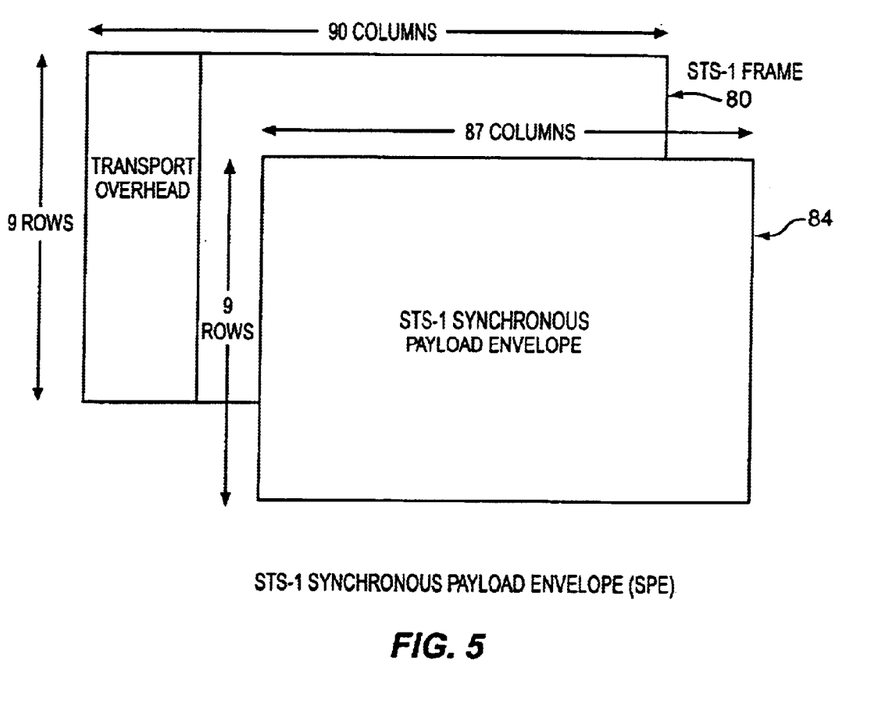
FIG. 5 is a graphical representation of a SONET STS-1 payload envelope.
Figure 6:
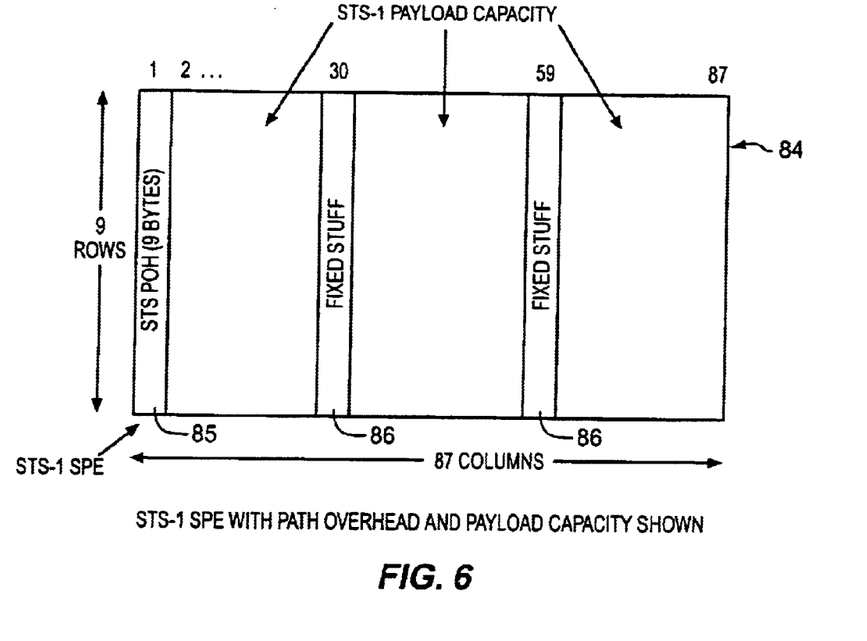
FIG. 6 is a graphical representation of a SONET STS-1 synchronous payload envelope (SPE) with path overhead and payload capacity.

The configuration of basic frame structure 80 of a SONET transmission signal is designated as an STS-1 and is shown in FIG. 4. Transport overhead 82 occupies a certain amount of space in every frame 80, leaving space or bandwidth for payload envelope 84, as shown in FIG. 5. As shown in FIG. 6, some designated path overhead 86 exists within payload envelope 84, leaving a specific amount of payload capacity.

Figure 7:
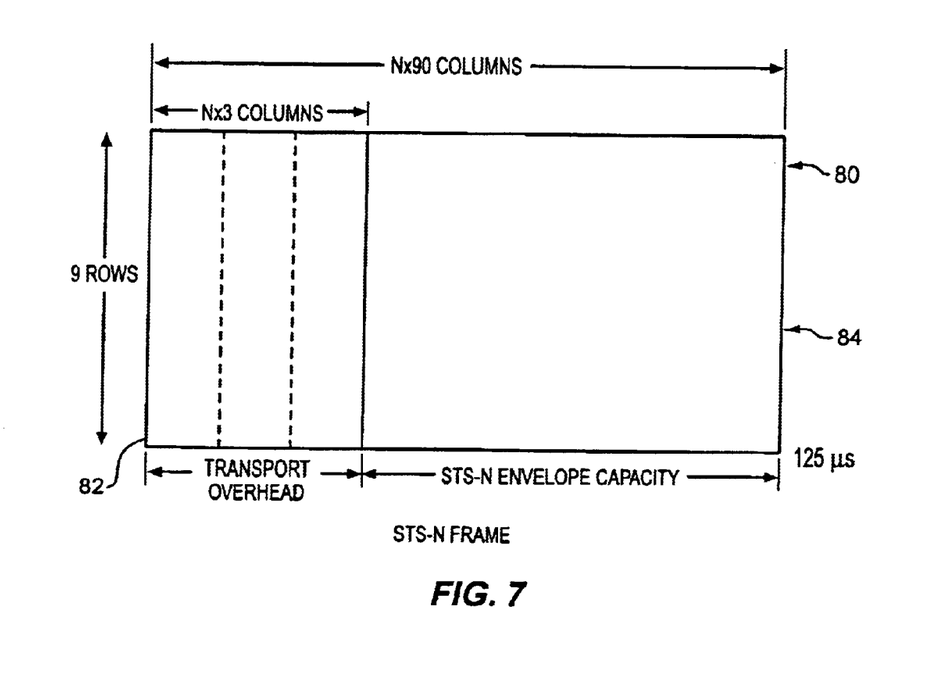
FIG. 7 is a graphical representation of a SONET STS-N frame.
Figure 8:
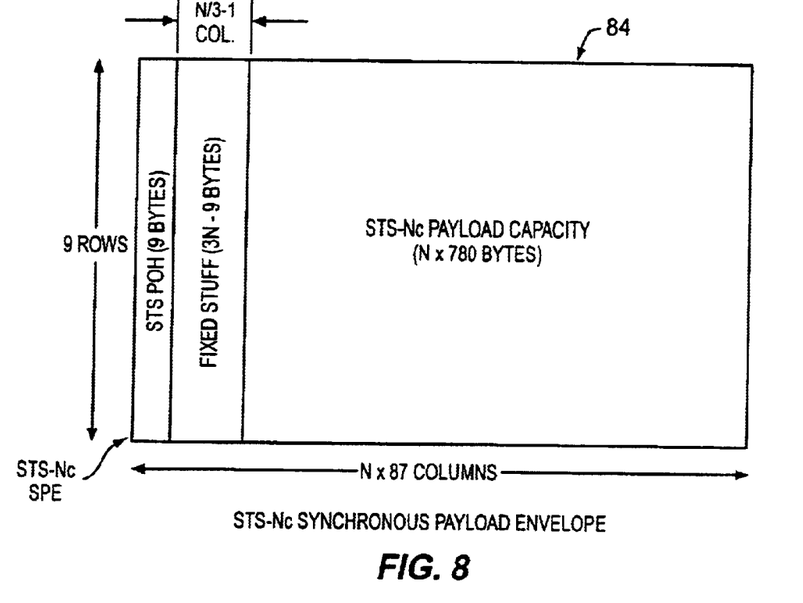
FIG. 8 is a graphical representation of a SONET STS-Nc synchronous payload envelope.

Referring to FIG. 7, the size of a given SONET frame 80 may vary, depending on its designed size, such as STS-1, STS-3, STS-12, STS-48, STS-N, where N is an integer multiple of the basic STS-1. As shown in FIG. 8, payload envelope 84 remains fixed in proportion to the size of frame 80, with overall payload capacity being fixed for each type of STS-N.

Figure 9:
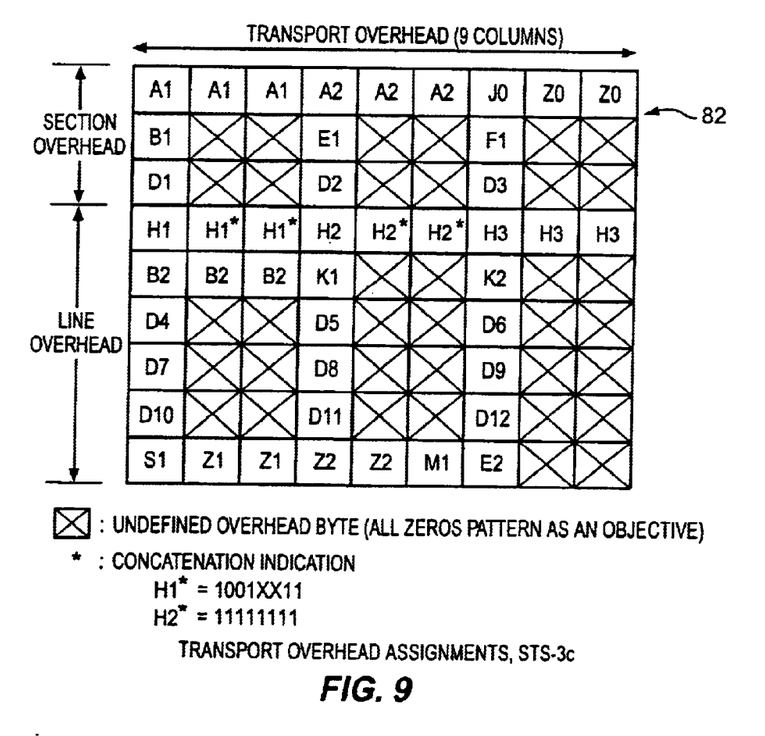
FIG. 9 is a graphical representation of transport overhead assignments in a SONET STS-3c frame.
Figure 10:
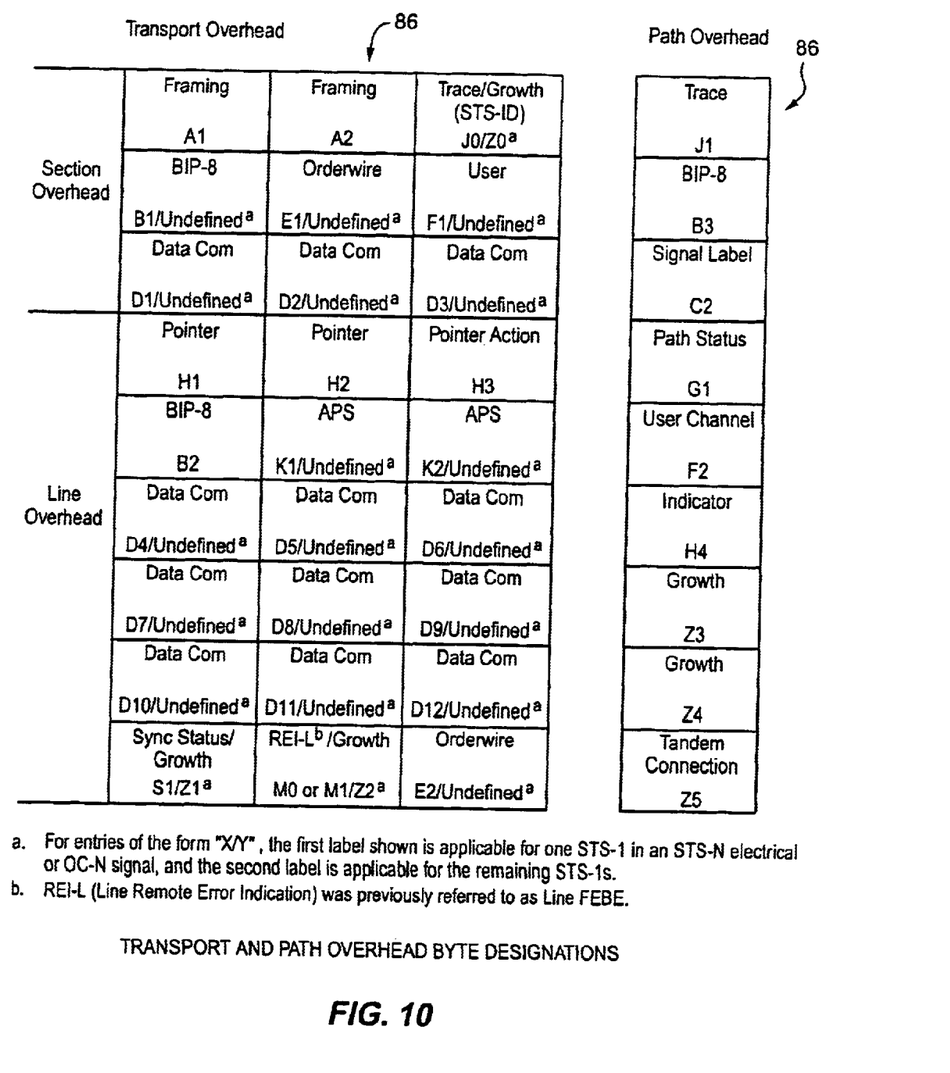
FIG. 10 is a graphical representation of transport and path overhead byte designations.

Referring to FIGS. 9 and 10, bytes occupying transport overhead 82 and path overhead 86 have various designations. The uses of these bytes pertain to the operation of the overall SONET system. The transmission of data using these overhead bytes does not reduce the available payload capacity used to carry customer traffic. The bytes marked by X in FIG. 9 have no specific designated purpose and may be used by equipment vendors to implement specific purposes identified as desirable for particular equipment or a particular network.

Various of these overhead bytes may be used to transmit network element identifier 66 or 70 and port identifier 64 and 68. Overhead bytes identified for other purposes may be modified and used to support this topology discovery process, or one or more of the undefined overhead bytes could be used. Using an undefined overhead byte may require that the STS-N carries multiple STS-1's. Since this may or may not be the case, one of the existing defined transport overhead bytes is re-defined in one preferred embodiment for implementation in SONET or SDH transmission systems. Future standards or other standards could have an overhead byte designated for the purpose of topology study at the time the systems or standards are designed.

In one preferred embodiment, the network element and port identifiers 64, 66, 68 and 70 are transmitted in the overhead from the source node to the destination node using SONET section trace bytes. Thus, the section trace registers are used as registers 72.

The SONET section trace byte is byte J0 in the transport overhead 82. This byte is an overhead byte, the use of which does not reduce the customer payload of the SONET transmissions. The SONET section trace byte (J0) is currently defined in Bellcore GR-253-CORE as follows:

Section Trace (J0)/Section Growth (Z0)—The byte in each of the N STS-1s an STS-N that was formerly defined as the STS-1 ID (C1) byte has been redefined either as the Section Trace byte (in the first STS-1 of the STS-N), or as a Section Growth byte (in the second through Nth STS-1s). Detailed criteria concerning the use of these bytes for their new functions are for further study. Until those details are determined, the following criteria apply. They will be modified as necessary when the details of the Section Trace feature and uses for the Section Growth bytes are defined.

O3-14 [17] STE that supports line-side signals should have the capability to access the J0 byte, which is located in the first STS-1 of an STS-N.

The ability to access the J0 byte is not required for STE that only supports drop-side signals.

R3-15 [18] Unless it is being used for a defined purpose (e.g., to carry a Section Trace message once the details of that feature are defined) each J0 and Z0 byte shall be set to a binary number corresponding to its order of appearance in the STS-N frame (i.e., the J0 byte shall be set to 00000001, the first Z0 byte shall be set to 00000010, the second Z0 byte to 00000011, etc.).

The preceding requirement is applicable for both line-side and drop-side signals. In ANSI T1.105-1995 the SONET Section Trace byte (J0) is defined as follows:

Section trace (J0): One byte is allocated to be used for a section trace function. This byte is defined only for STS-1 number 1 of an STS-N signal. This byte, J0 (formally C1 of STS-1 number 1) is used to repetitively transmit a one byte fixed length string so that a receiving terminal in a section can verify its continued connection to the intended transmitter. The content of this message is not to be constrained by this standard since it is assumed to be user programmable at both the transmit and receive ends. This will provide up to 256 possible values for section trace. When the Section Trace function is not supported or if no value has been programmed, then 01 Hex shall be transmitted. SDH also uses this byte as Section Trace, but prefers a 16-byte trace message.

Pursuant to this definition, the Section Trace byte is used so that a receiving terminal, such as network element 44, in a section, after being manually provisioned with an appropriate identification, can verify continued connection to the intended transmitter, such as network element 42.

The section trace byte is redefined or programmed to communicate network element and port identifiers 64, 66, 68 and/or 70. If more than 256 identifiers are required to uniquely identify each port 52, 54, 56, 58, 60 and 62 and each network element 42 and 44, then the section trace byte may be defined as more than one byte.

Although presently defined as a single byte for SONET, the Section Trace has been defined by SDH standards groups as a 16-byte repetitive message string using the section trace byte. In one embodiment, the need for a larger section trace information content in SONET is accommodated by increasing the size from one repeating byte in every frame to a repeating sequential string message of bytes in successive frames. The duration of the string, in terms of the number of successive frames that must be sent before repeating the string, must be long enough to adequately identify the data contained in the section trace as being unique in a large network. The Section Trace Byte string could be made as large as the currently existing path trace byte (J1) string, or even larger if necessary.

The path trace byte, J1, is defined, from ANSI T1.105, below.

STS path trace (J1)—Class A: This byte is used to repetitively transmit a 64-byte, fixed-length string so that a receiving terminal in a path can verify its continued connection to the intended transmitter. The content of the message is not constrained by this standard, since it is assumed to be user programmable at both the transmit and receive ends. However, it is suggested that a 8-bit ASCII string padded with NULL characters and terminated with CR/LF, would be a suitable 64 byte trace message. If no message has been loaded, than 64 NULL characters (Hex 00) shall be transmitted.

SDH uses this byte for an access point identifier and prefers a 61-byte string.

A long message string, similar in size to the SONET J1 byte, transmitted by the Section Trace Byte, J0, provides unique identification for network topology auto-discovery as discussed herein. While the section trace byte is used in one embodiment, other SONET or SDH overhead data may be used, as could overhead data in other future yet to be defined systems.

Figure 11:
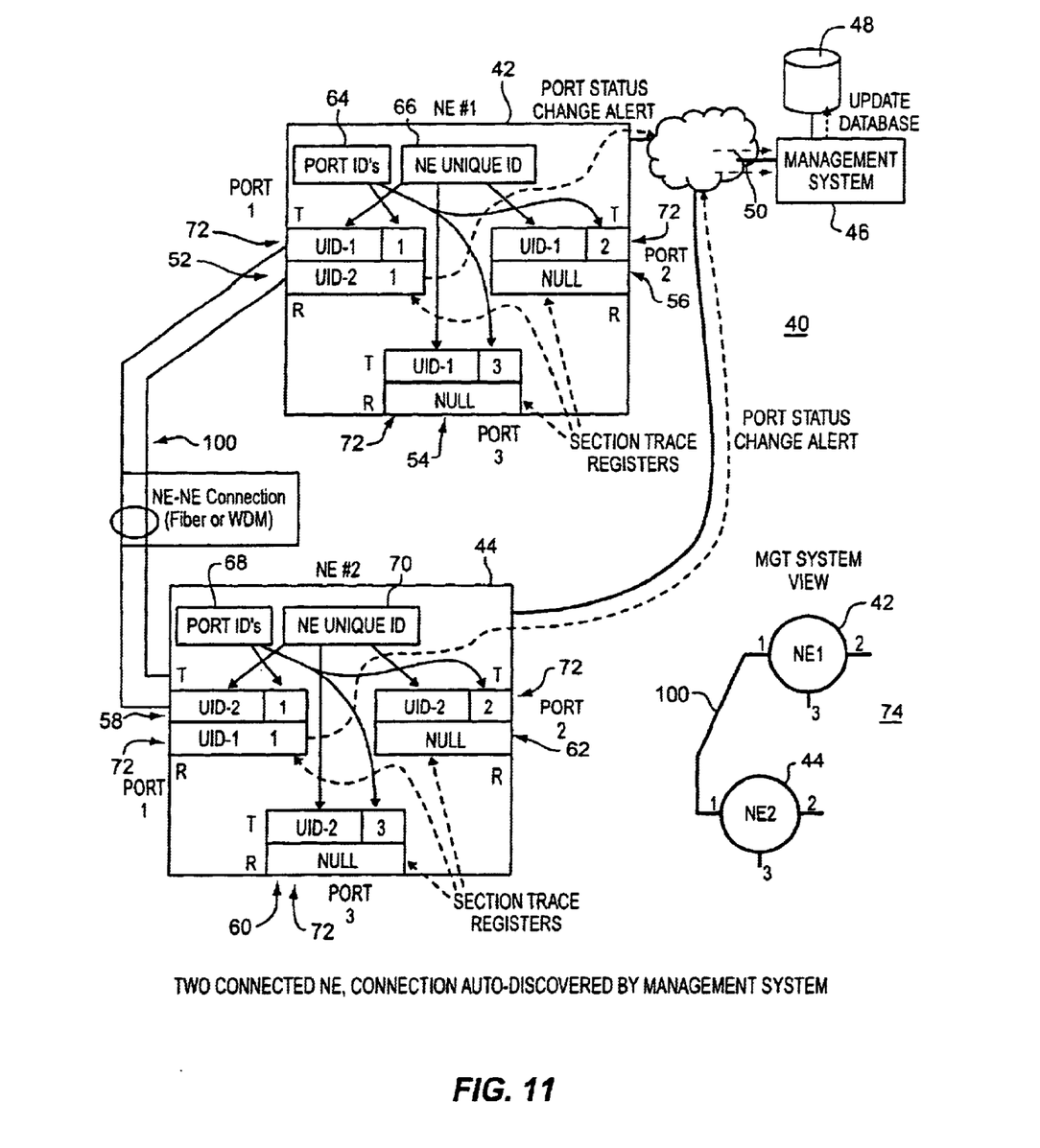
FIG. 11 is a graphical representation of the second embodiment of two network elements in a telecommunications network of FIG. 3 with associated connections.

Referring to FIG. 11, network 40 is shown with link 100 from network element 42 to network element 44. Port 52 transmits data to port 58 over link 100.

Identifiers, such as identifier 64 and 66, are entered into register 72 associated with a given output port, such as port 52, for transmission as section trace bytes in the SONET framing overhead. The received identifiers at the destination node are accumulated and held in register 72 associated with an input port, such as port 58, at the adjacent network element, such as network element 44.

The section trace information from network element 42 is communicated through the traffic stream signal framing (i.e. in the section trace (J0) byte). Once link 100 is established, receive section trace register 72 associated with port 58 changes from NULL to the section trace data results (e.g. identifiers 64 and 66). This change in receive section trace register 72 is communicated to management system 46, and the register contents are transferred to management system 46. The transfer is provided either directly, by being associated with the alert that there has been a port status change, or indirectly, when the management system queries network element 44 following the reception of a port status change. In alternative embodiments, network element 44 periodically transmits the information to management system 46.

Management system 46 obtains the contents of all registers 72 in network 40. In one embodiment, only information in registers 72 associated with changes are subsequently obtained. In alternative embodiments, information from one or more of registers 72 is periodically queried or obtained regardless of any change.

The information is used to determine associations between network elements 42 and 44. These associations define network topology 74. In the example of FIG. 11, link 100 comprises a two-way communications link between network elements 42 and 44. Registers 72 associated with connected ports 52 and 58 include source identifiers 64, 66 and 68, 70, respectively and destination identifiers 68, 70 and 64, 66, respectively. Management system 46 determines topology 74 from the identifiers.

Whenever a new port card is installed, the new port card is assigned a unique section trace in the new port card's transmit register. When the new port card is connected through optical or other media to a corresponding far-end port, the received section trace generates an event report. In response, management system 46 retrieves the section trace information. The retrieved information is added to the existing network topology, in an "auto-discovery" process through correlation of identifiers.

It should be understood that many changes and modifications can be made to the embodiments described above. For example, different standards other than SONET or SDH may be used. Different overhead bytes may also be used to provide the identifiers. It is therefore intended that the foregoing detailed description be understood as an illustration of the presently preferred embodiments of the invention, and not as a definition of the invention. It is only the following claims, including all equivalents, that are intended to define the scope of the invention.

What is claimed is:

1. A method for determining network topology in a communications network of a plurality of network elements, the method comprising the steps of:

(a) establishing connections between the plurality of network elements wherein each of the network elements comprises a plurality of ports;

(b) continuously transmitting data between the plurality of network elements over the connections wherein each transmission of data comprises overhead data and payload data;

(c) in the overhead data of each transmission of data, providing a network element identification that identifies one of the network elements that the data was immediately transmitted from;

(d) in the overhead data of each transmission of data, providing a port identification that identifies a source port of the plurality of ports that the data was immediately transmitted from;

(e) continuously receiving the data over the connections between the plurality of the network elements; and (f) determining the network topology from at least the network element identification and the port identification provided in the overhead data of each transmission of data continuously transmitted between the plurality of network elements over the connections.

2. The method of claim 1 wherein step (b) comprises continuously transmitting the data, the data comprising physical layer overhead data and payload capacity.

3. The method of claim 1 wherein step (c) of providing a network element identification is without reduction of a bandwidth of the payload data and wherein step (d) of providing a port identification is without reduction of the bandwidth of the payload data.

4. The method of claim 1 wherein step (f) comprises determining the network topology with a management system.

5. The method of claim 4 further comprising step (g) of transferring the network element identification and the port identification to the management system.

6. The method of claim 5 further comprising step (h) of flagging a change in the network element identification; and wherein step (g) is performed in response to the flag.

7. The method of claim 5 further comprising step (g) is performed in response to a query from the management system.

8. The method of claim 1 wherein the communications network operates pursuant to a standard comprising SONET.

9. The method of claim 1 wherein step (b) comprises transmitting STS overhead data, the STS overhead data comprising at least a section trace information; and wherein step (c) comprises providing the network element identification in the section trace information.

10. A system for determining network topology in a communications network, the system comprising:

connections between a plurality of network elements;

the plurality of the network elements wherein each of the network elements comprises a plurality of ports and wherein the plurality of the network elements are configured to continuously transmit data between the plurality of network elements over the connections wherein each transmission of data comprises overhead data and payload data, in the overhead data of each transmission of data, provide a network element identification that identifies one of the network elements that the data was immediately transmitted from, in the overhead data of each transmission of data, provide a port identification that identifies a source port of the plurality of ports that the data was immediately transmitted from and continuously receive the data over the connections between the plurality of the network elements; and a management system configured to determine the network topology from at least the network element identification and the port identification provided in the overhead data of each transmission of data continuously transmitted between the plurality of network elements over the connections.

11. The system of claim 10 wherein the plurality of network elements are configured to continuously transmit the data, the data comprising physical layer overhead data and payload capacity.

12. The system of claim 10 wherein the plurality of network elements are configured to provide a network element identification without reduction of a bandwidth of the payload data and provide a port identification without reduction of the bandwidth of the payload data.

13. The system of claim 10 wherein the plurality of network elements are configured to transfer the network element identification and the port identification to the management system.

14. The system of claim 13 wherein the plurality of network elements are configured to flag a change in the network element identification and transfer the network element identification and the port identification in response to the flag.

15. The system of claim 13 wherein the plurality of network elements are configured to transfer the network element identification and the port identification in response to a query from the management system.

16. The system of claim 10 wherein the communications network operates pursuant to a standard comprising SONET.

17. The system of claim 10 wherein the plurality of network elements are configured to transmit STS overhead data, the STS overhead data comprising at least a section trace information and provide the network element identification in the section trace information.

* * * * *